United States Patent [19]
Russell

[11] Patent Number: 5,835,450
[45] Date of Patent: Nov. 10, 1998

[54] LEAD-IN CONFIGURATION FOR MULTIPLE STREAMERS AND TELEMETRY METHOD

[75] Inventor: Michael J. Russell, New Milton, United Kingdom

[73] Assignee: PGS Exploration AS, Lysaker, Norway

[21] Appl. No.: 668,361

[22] Filed: Jun. 26, 1996

[51] Int. Cl.⁶ .............................. G01V 1/20; G01V 1/36; B03B 21/56
[52] U.S. Cl. .............................................. 367/20; 367/106
[58] Field of Search .................................... 367/16, 17, 20, 367/106, 177; 114/246, 253

[56] References Cited

U.S. PATENT DOCUMENTS

| | | | |
|---|---|---|---|
| 2,465,696 | 3/1949 | Pasley | 367/20 |
| 3,414,874 | 12/1968 | McLoad | 367/20 |
| 4,727,956 | 3/1988 | Henzler | 181/111 |
| 4,798,156 | 1/1989 | Langelard et al. | 114/242 |
| 4,862,422 | 8/1989 | Brac | 367/19 |
| 4,958,331 | 9/1990 | Wardle . | |
| 5,532,975 | 7/1996 | Elhalen | 367/16 |

FOREIGN PATENT DOCUMENTS 2180341 3/1987 United Kingdom .

*Primary Examiner*—Nelson Moskowitz
*Attorney, Agent, or Firm*—Gordon T. Arnold

[57] ABSTRACT

A system for transmitting signals between a plurality of towed sensor streamers and a seismic vessel, the system comprising: a plurality of seismic streamers, wherein each streamer of the plurality of seismic streamers comprises: a leading end, a trailing end, a plurality of sensors located therein and a transmitter of seismic signals received by the plurality of sensors to a terminal located in the leading end of the streamer; at least one spreader located between the leading ends of two streamers of the plurality of seismic streamers, the spreader comprising: connectors for connection to the terminals of the streamers, a spreader terminal, and a spreader transmitter of signals between the connectors and the spreader terminal; a lead-in having a lead-in connector for connecting to the spreader terminal and a transmitter of signals between the lead-in connector and the seismic vessel. A seismic streamer system comprising: a lead-in, and multiple streamers; wherein the multiple streamers are signal-connected to the lead-in, and wherein at least two of the streamers are signal-connected by at least one spreader. A process comprising: transmitting signals between at least two streamers of a plurality of streamers; transmitting signals between a first lead-in and the plurality of streamers; and transmitting signals between the first lead-in and the vessel. A process comprising: transmitting signals between each streamer of the plurality of streamers and a spreader bus; transmitting signals between the spreader bus and at least one lead-in, wherein the number of streamers of the plurality of streamers is greater than the number of lead-ins; and transmitting signals through at least one lead-in to the vessel.

20 Claims, 13 Drawing Sheets

LEAD-IN CONFIGURATION FOR MULTIPLE STREAMERS AND TELEMETRY METHOD

FIELD OF INVENTION

This invention relates to marine seismic surveying apparatuses and methods. In particular, this invention relates to lead-in configurations for single vessel, multiple streamer array systems and methods for transmitting signals from multiple streamers to a single tow vessel.

BACKGROUND OF INVENTION

One of several techniques for surveying subsea strata is to tow a number of submerged hydrophones behind a vessel over the survey area. Typically, the hydrophones are contained in one or more cables called streamers. Seismic impulses are generated in the vicinity of the hydrophones so that sound from the generated impulse is echoed back from the sea bottom and the underlying strata to the hydrophones. The hydrophones sense the reflected sound waves and transmit corresponding electrical signals to the vessel where they are recorded.

Because it is advantageous to extend the hydrophone pattern over a large portion of the survey area, several streamers are towed at the same time. Referring to FIG. 1a, streamers 1, 2 and 3 are pulled from vessel 15. Arrow 20 indicates a forward motion of the vessel 15. Paravanes 18 and 19 are towed from the vessel 15 by superwides 16 and 17 respectively. The paravanes 18 and 19 comprise hydrofoils which pull the superwides 16 and 17 transversely away from the vessel 15. Thus, streamers 1 and 3 are attached to superwides 16 and 17 via deflectors 7 and 8. This enables several streamers to be pulled from a single vessel in a wide pattern. In this configuration, each of the streamers are attached to the vessel 15 with its own lead-in. For example, streamer 1 is attached to the vessel via lead-in 5. Streamer 2 is similarly attached to the vessel 15 by lead-in 4. Thus, data signals from each of the streamers are transmitted to the vessel via its own lead-in.

Referring to FIG. 1b, a configuration for towing four streamers from a single vessel is shown. Like the prior embodiment, paravanes and superwides are used to widen the streamer pattern and each streamer is attached to the vessel 15 by its own lead-in. For instance, streamer 11 is connected via lead-in 21 and streamer 13 is connected via lead-in 6.

Additional streamer configurations are also known. For example, U.S. Pat. No. 3,973,236 issued to McLaughlin on Aug. 3, 1976, incorporated herein by reference, discloses a system for maintaining a two legged hydrophone array in a horizontal plane. This system uses a pair of directional maneuverable drogue shoots for providing tension on the hydrophone array and for maintaining the desired angle between the two legs. The legs or streamers are attached to each other and then to a single tow line or lead-in. Thus, in this configuration, the streamers are not parallel but instead form a V-shape.

An alternative method is to use several vessels to tow multiple streamers over the same survey area. As shown in FIG. 1c, vessels 15a and 15b tow streamers 2a and 2b simultaneously. While each vessel is shown towing only a single cable, an alternative embodiment comprises a configuration wherein multiple streamers are towed from each vessel simultaneously. Regardless of the number of streamers, in these embodiments each streamer is attached to the vessel via its own lead-in cable. As shown in FIG. 1c, streamer 2a is attached to the vessel 15a via lead-in 4b.

Where several vessels are used, however, complicated timing and communication devices must be employed to ensure that the source and receiver instruments towed by the various vessels are properly synchronized. Single vessels systems are more desirable because timing and communications are eliminated, operational logistics are simplified, and, in most cases, the cost of the operation is less expensive than a multivessel crew.

Regarding single vessel, multiple streamer systems, it is desirable to minimize the drag in the water for economical reasons, by minimizing fuel and vessel power requirements, and to maximize the achievable streamer separation. Therefor, a multiple streamer configuration for a single tow vessel which produces less drag is highly desirable. Each of the streamer configurations discussed above present multiple tow lines and lead-ins which must be pulled transversely through the water. For example, as shown in FIG. 1b, as paravanes 18 and 19 are towed through the water, they pull the streamers and lead-ins transversely away from the forward direction of the vessel. The lead-ins 5, 6, 21 and 22 present large transverse surfaces which induce drag. Thus, this configuration requires a relatively larger and more powerful vessel to tow the streamers configuration over the survey area.

Therefore, there is a need for a reduced drag multi-streamer configuration which allows multiple streamers to be towed from a single vessel and produces less drag when towed through water.

SUMMARY OF INVENTION

An object of the present invention is to provide a multiple streamer configuration for use with a single tow vessel which requires relatively less power to pull the configuration through the water without sacrificing the length of the streamers or the width of the streamer pattern.

According to one aspect of the invention, there is provided a system for transmitting signals between a plurality of towed sensor streamers and a seismic vessel, the system comprising: a plurality of seismic streamers, wherein each streamer of the plurality of seismic streamers comprises: a leading end, a trailing end, a plurality of sensors located therein and a transmitter of seismic signals received by the plurality of sensors to a terminal located in the leading end of the streamer; at least one spreader located between the leading ends of two streamers of the plurality of seismic streamers, the spreader comprising: connectors for connection to the terminals of the streamers, a spreader terminal, and a spreader transmitter of signals between the connectors and the spreader terminal; a lead-in having a lead-in connector for connecting to the spreader terminal and a transmitter of signals between the lead-in connector and the seismic vessel.

In a further embodiment of this aspect, there is provided a seismic streamer system comprising: a lead-in, and multiple streamers; wherein the multiple streamers are signal-connected to the lead-in, and wherein at least two of the streamers are signal-connected by at least one spreader.

According to another aspect of the invention, there is provided a process comprising: transmitting signals between at least two streamers of a plurality of streamers; transmitting signals between a first lead-in and the plurality of streamers; and transmitting signals between the first lead-in and the vessel.

In a further embodiment of this aspect of the invention, there is provided a process comprising: transmitting signals between each streamer of the plurality of streamers and a spreader bus; transmitting signals between the spreader bus and at least one lead-in, wherein the number of streamers of the plurality of streamers is greater than the number of lead-ins; and transmitting signals through at least one leading to the vessel.

BRIEF DESCRIPTION OF THE DRAWINGS

The present invention is better understood by reading the following description of nonlimitative embodiments with reference to the attached drawings, wherein like parts in each of the several figures are identified by the same reference character, which are briefly described as follows:

FIG. 6 is a top view of an embodiment of the invention wherein eight streamers are towed from a single vessel and data is transmitted between all eight streamers and the vessel via a single lead-in;

It is to be noted, however, that the appended drawings illustrate only typical embodiments of the invention and are therefore not to be considered a limitation of the scope of the invention which includes other equally effective embodiments.

DETAILED DESCRIPTION OF THE INVENTION

Figure 1A:
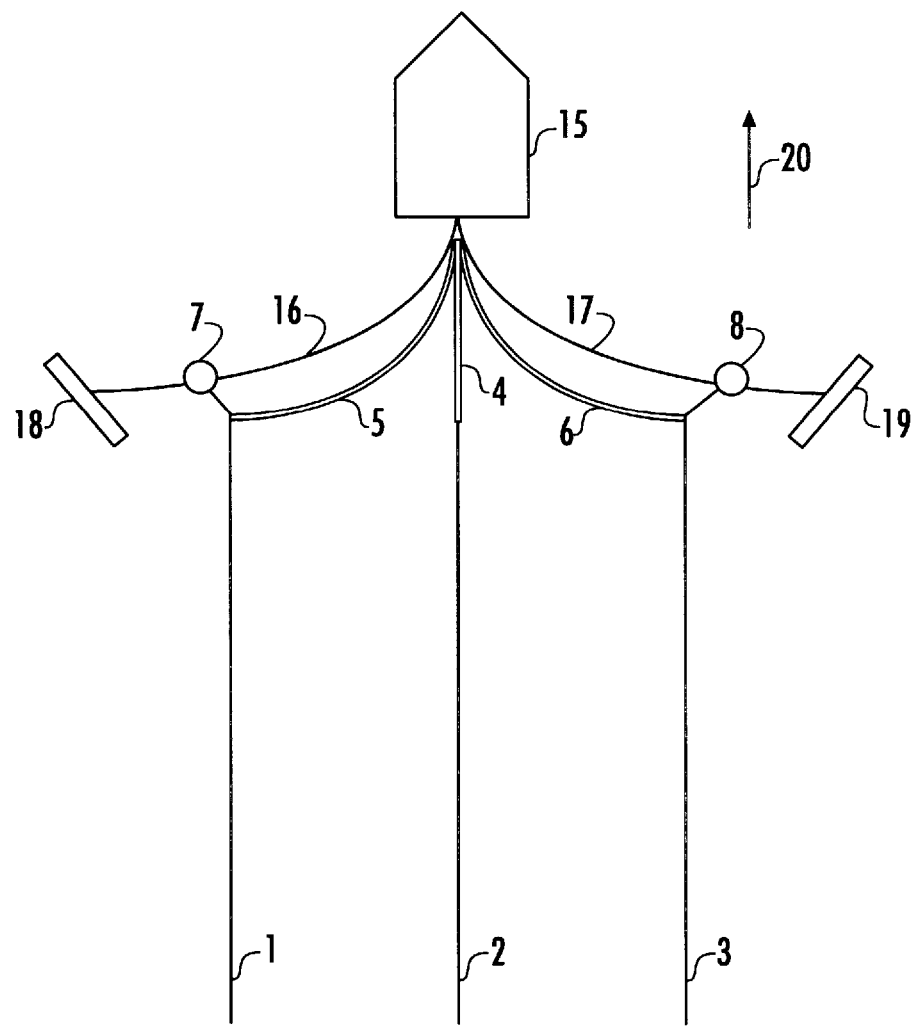
FIG. 1a is top view of a prior art system for towing three streamers from a single vessel.
Figure 1B:
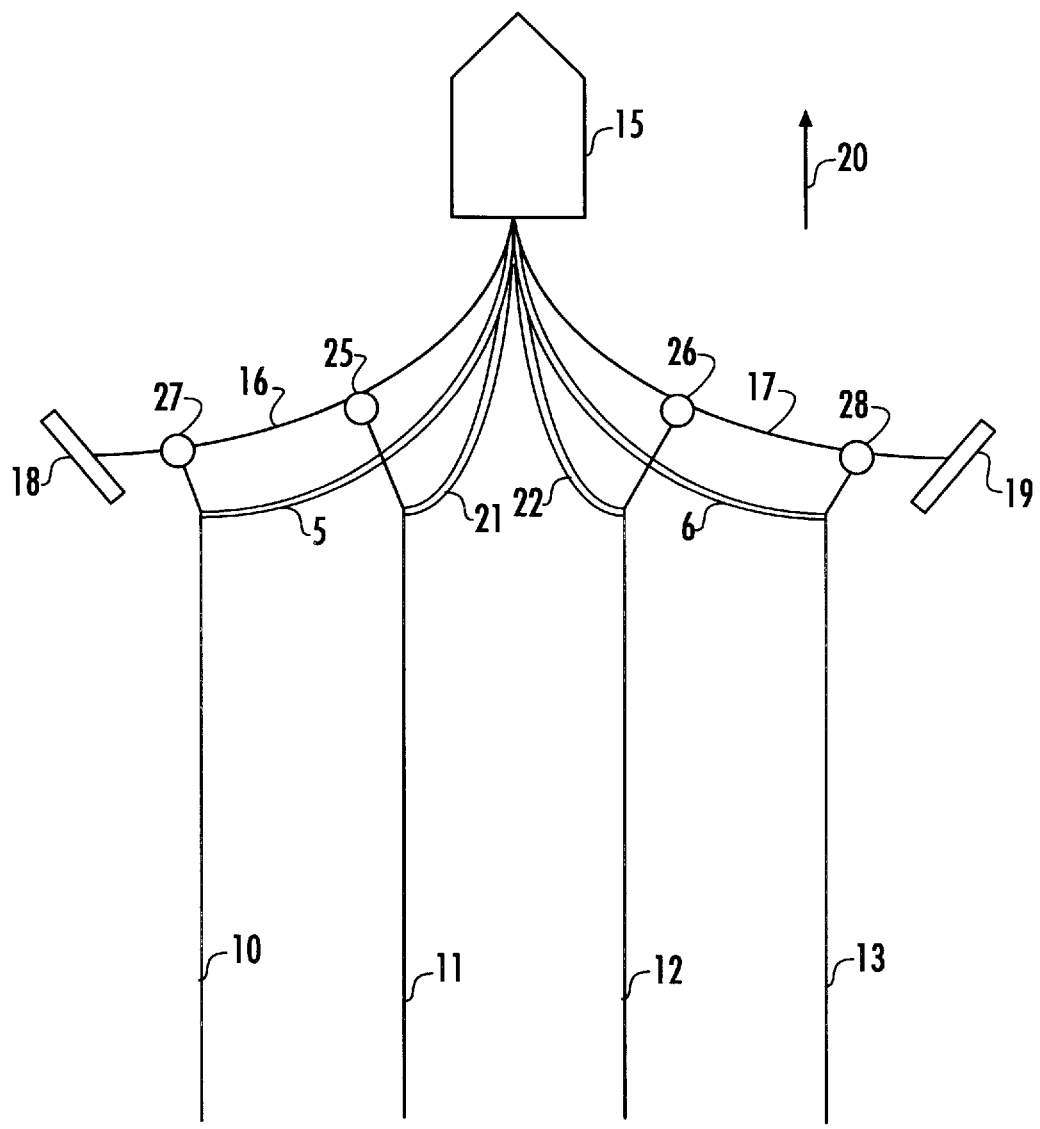
FIG. 1b is a top view of a prior art system for towing four streamers from a single tow vessel.
Figure 1C:
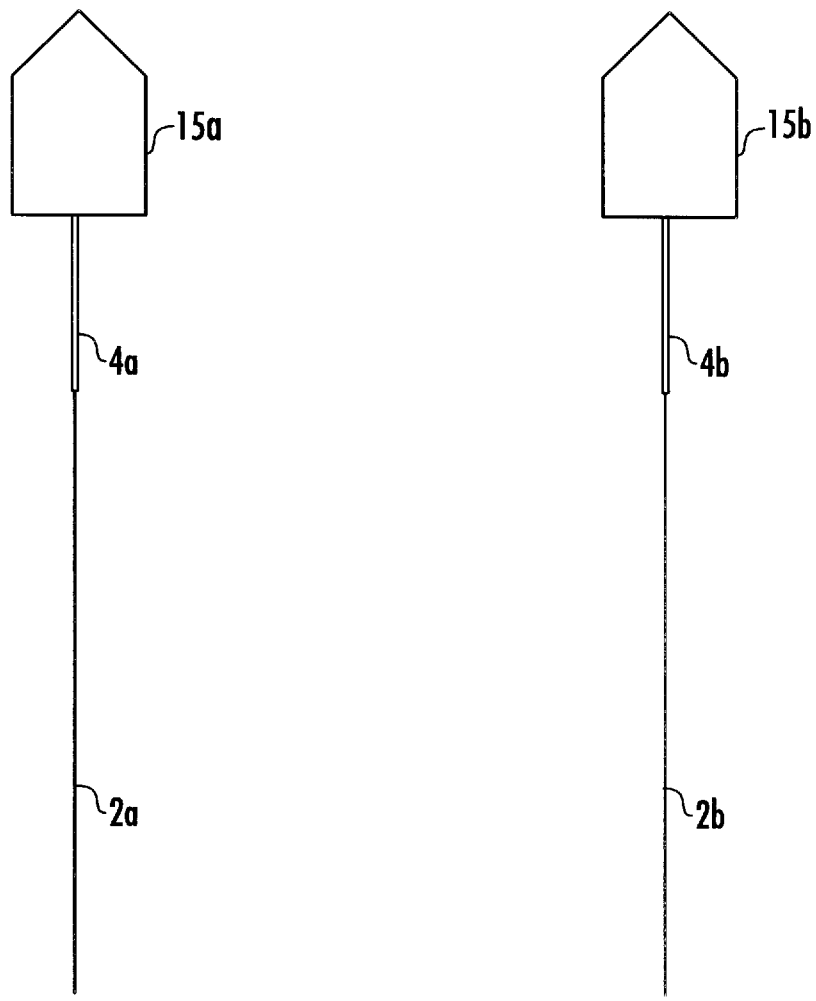
FIG. 1c is a top view of a prior art system for towing two streamers over a survey area, each streamer being towed by different vessels.
Figure 2A:
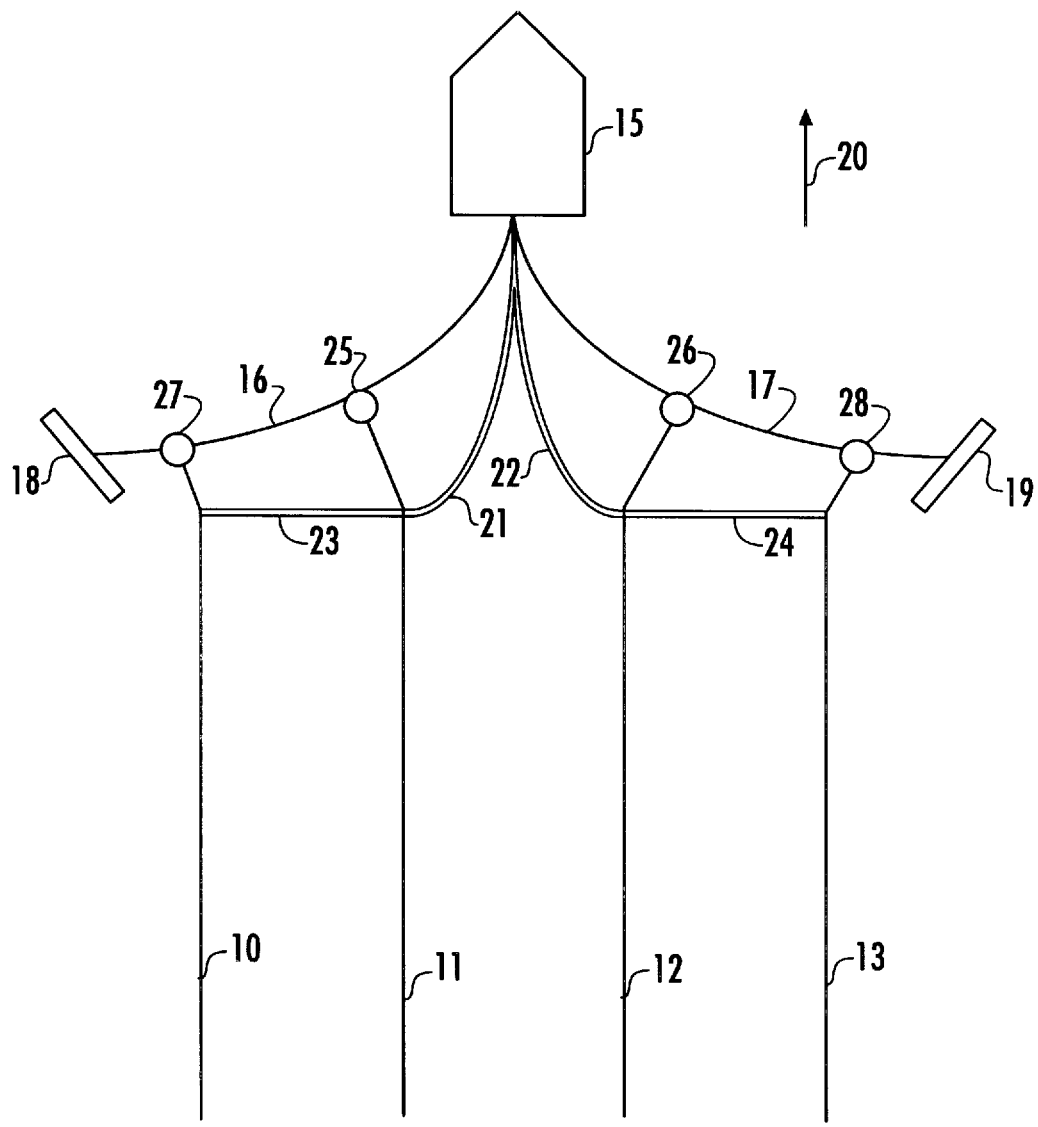
FIG. 2a is a top view of an embodiment of the invention for towing four streamers from a single tow vessel.

Referring to FIG. 2a, an embodiment of the invention is shown wherein four streamers are towed from a seismic vessel. Streamers 10 and 11 are towed from one side of the vessel 15 while streamers 12 and 13 are towed from the other. Superwides 16 and 17 are also towed behind the vessel 15 with paravanes 18 and 19 attached to the ends of superwides 16 and 17 respectively. Paravanes 18 and 19 are well known and comprise buoyant hydrofoils designed to pull the superwides transversely away from the vessel relative to the vessels line of travel. As the vessel 15 moves through the water in a forward direction, indicated by arrow 20, the paravanes 18 and 19 pull the superwides 16 and 17 away from the ship in opposite directions. Streamers 11 and 12 are towed from the vessel 15 by lead-ins 21 and 22 respectively. Streamers 10 and 13 are towed from the vessel 15 by spreaders 23 and 24 respectively. Additionally, streamers 11 and 12 are deflected from positions directly behind the vessel 15 by deflector means 25 and 26 respectively. Similarly, streamers 10 and 13 are deflected from positions directly behind vessel 15 by deflectors 27 and 28 respectively. The well known deflectors comprise a cable attached to a block and tackle mechanism at the superwide. In this configuration, data signals and power supply for streamers 11 and 12 are carried to and from the vessel 15 through lead-ins 21 and 22. Data signals and power supply for streamers 10 and 13 are carried over through spreaders 23 and 24 and lead-ins 21 and 22, respectively.

It is to be understood that while the term "spreader" is used to define the transmission lines identified by reference numbers 23 and 24 in FIG. 2a, the spreaders do not necessarily perform a weight bearing function. A purpose of a spreader is to provide power and transmit data signals between a lead-in and a streamer. In some embodiments of the invention, however, the spreader will also be in tension to carry some of the streamer load. In further embodiments, the spreader is capable of carrying a compressive load to ensure the minimum distances between streamers are maintained.

Figure 2B:
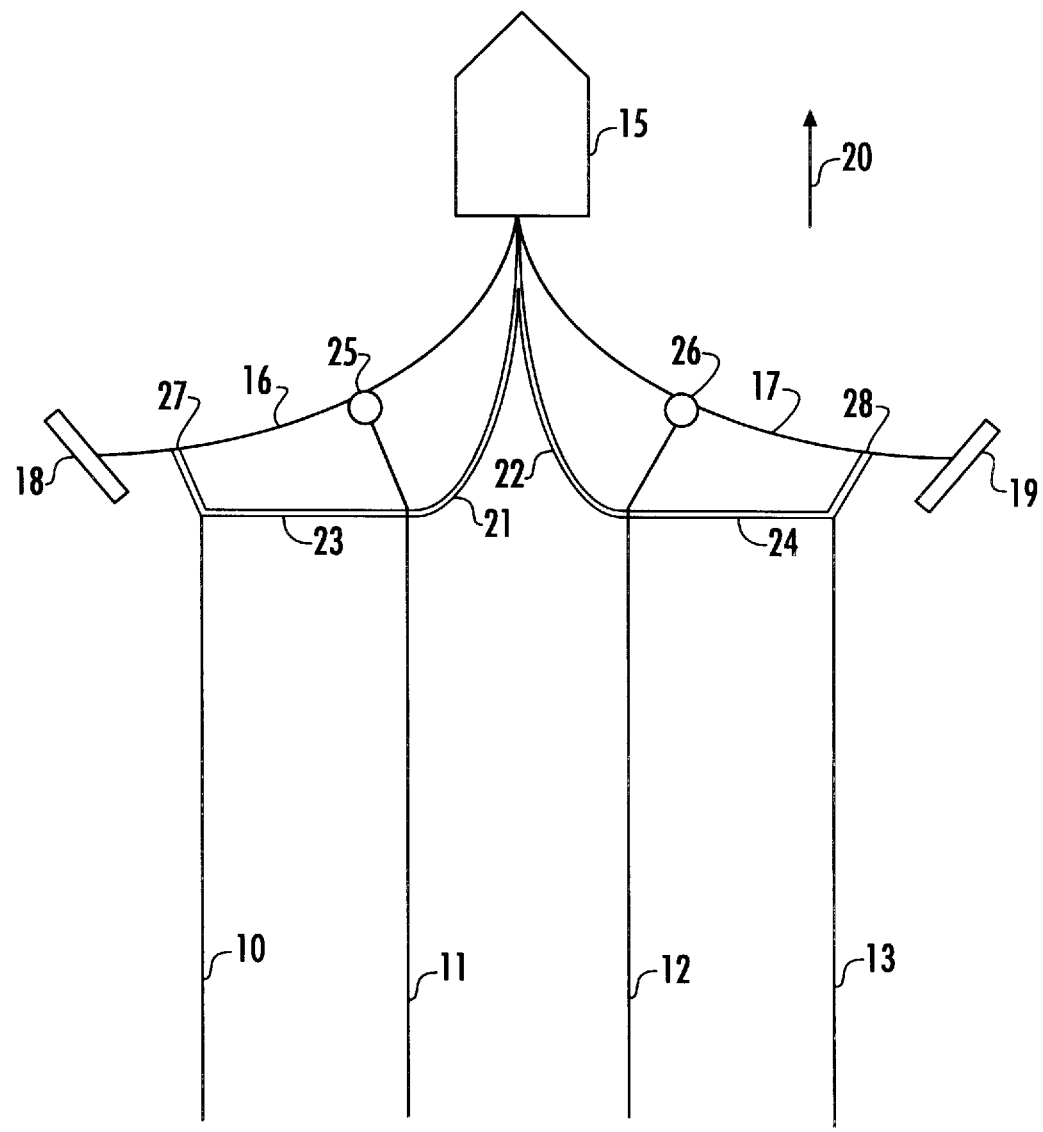
FIG. 2b is a top view of a further embodiment of the invention for towing four streamers from a single tow vessel.

Referring to FIG. 2b, an embodiment of the present invention is shown comprising multiple lead-ins. In this embodiment the superwides 16 and 17 perform dual functions. First, they drag the paravanes 18 and 19 through the water so that the streamers are deflected from directly behind the vessel 15. Second, they supply power and transmit data signals to and from the streamers 10–13. In particular, spreaders 23 and 24 are connected directly to superwides 16 and 17 so that power and data signals are transmitted through the connection. In this embodiment power supply and data signals for streamers 10 and 11 are transmitted through either the lead-in 21 or the superwide 16. Similarly, power supply and data signals for streamers 12 and 13 are transmitted through either the lead-in 22 or the superwide 17.

Figure 3:
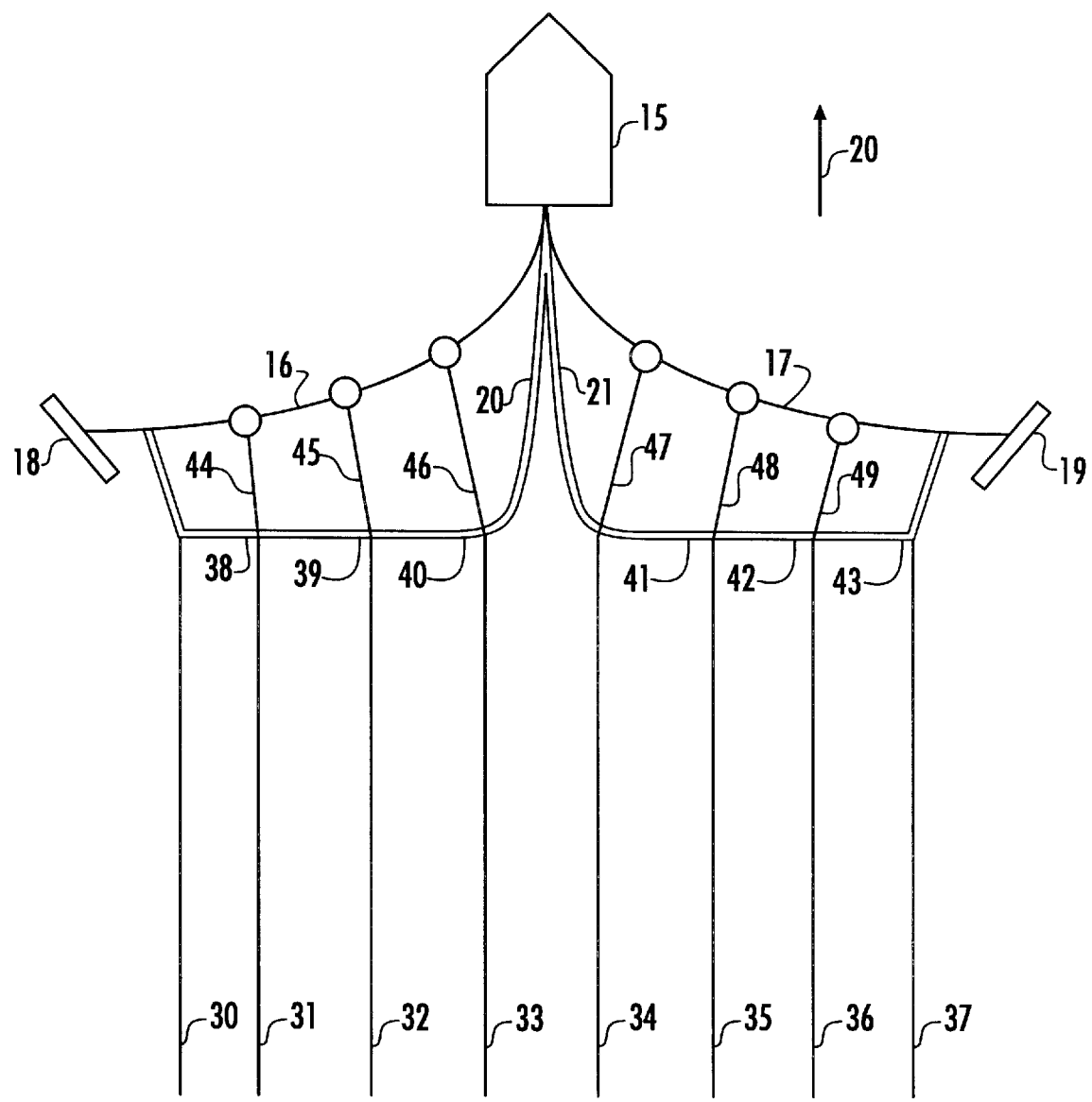
FIG. 3 is a top view of an embodiment of the invention for towing eight streamers from a single tow vessel.

Referring to FIG. 3, an embodiment of the invention is shown wherein eight streamers are towed from vessel 15. Again paravanes 18 and 19 are used to pull the streamers transversely away from the direction of forward motion so that the streamers do not follow directly behind the vessel 15. Streamer 30 is connected to streamer 31 via spreader 38, streamer 31 is connected to streamer 32 via spreader 39 and streamers 32 and 33 are connected via spreader 40. Similarly, streamers 34 and 35 are connected via spreader 41, streamers 35 and 36 are connected via spreader 42 and streamers 36 and 37 are connected via spreader 43. Spreader 38 is also connected to superwide 16, which doubles as a tow line and a transmission line. Spreader 43 is similarly attached to superwide 17. Spreaders 40 and 41 are connected to lead-ins 20 and 21, respectively. The streamers are deflected from positions behind the vessel 15 by deflectors 44–49.

In a further embodiment of the present invention, both power and signal transmissions are multiplexed between the various streamers and the recorder on the vessel. In the embodiments shown in FIGS. 4a and 4b, spreaders 38, 39 and 40 (FIG. 3) comprise a spreader bus 68 upon which data from each of the streamers 30 through 33 are transmitted.

Command signals are also transmitted from the vessel to each of the streamers over the spreader bus 68. In this configuration, data commands and signals for all four streamers are transmitted over the spreader bus 68 and lead-in 20. Spreaders 41, 42 and 43 (FIG. 3) comprise a similar spreader bus 69 for command and data transmissions for streamers 34 through 37 through lead-in 21. Power is supplied to each of the streamers via two conductor lines which complete a circuit. Through multiplexing, each of the streamers may be turned off at any given time when necessary as controlled by the command signal transmitted of the spreader bus. The power lines also extend through spreaders 38, 39, and 40 and through leading 20. Similar power lines extend through spreaders 41, 42, and 43 and through leading 21.

Figure 4A:
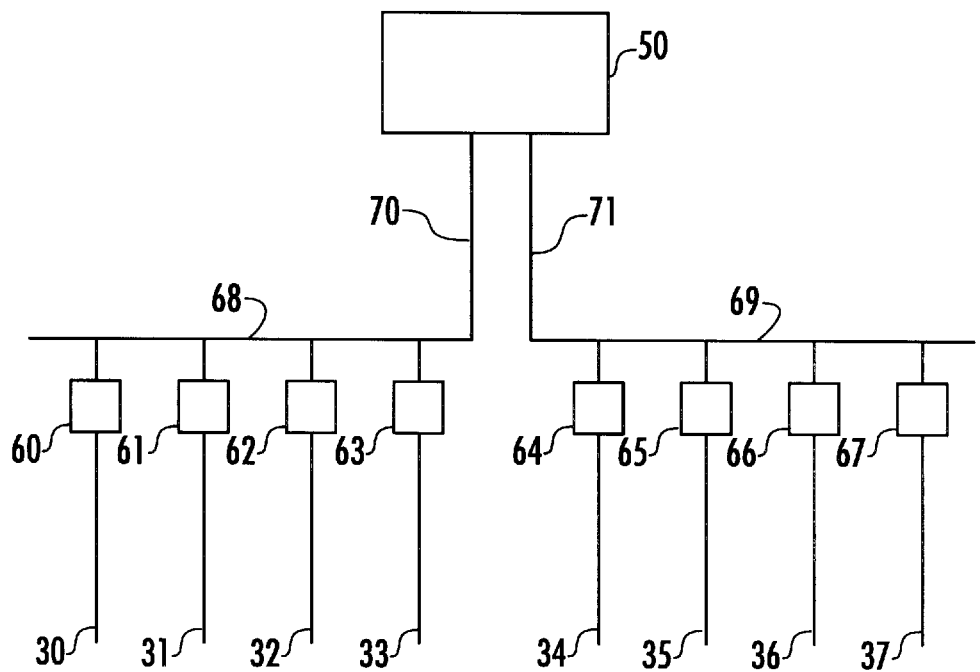
FIG. 4a is a schematic diagram for connecting streamer transmission lines to a recorder on the tow vessel via multiplexers or enabling means and data buses.

In FIG. 4a, streamers 30 through 37 are each connected to switches 60 through 67, respectively. The switches 60 through 63 are then connected to spreader bus 68 and switches 64 though 67 are attached to spreader bus 69. The spreader buses 68 and 69 are attached to the recorder/controller 50 via transmission lines 70 and 71 respectively. The transmission lines 70 and 71 are, of course, contained within the lead-ins 20 and 21 referenced in FIG. 3. Thus, in this embodiment, data from multiple streamers is transmitted to the recorder/controller 50 over a single spreader bus, 68 or 69, and transmission line, 70 or 71. In some embodiments, switches 60 through 67 are means for enabling data transmission from the streamers, rather then actual switches, as known to those of skill in the art.

In a further embodiment, each switch of switches 60 through 67 operate to enable various modules or sections of the streamer to which the switch is attached. Thus, data from various sections of the streamer is multiplexed as well as data from the several streamers.

Figure 4B:
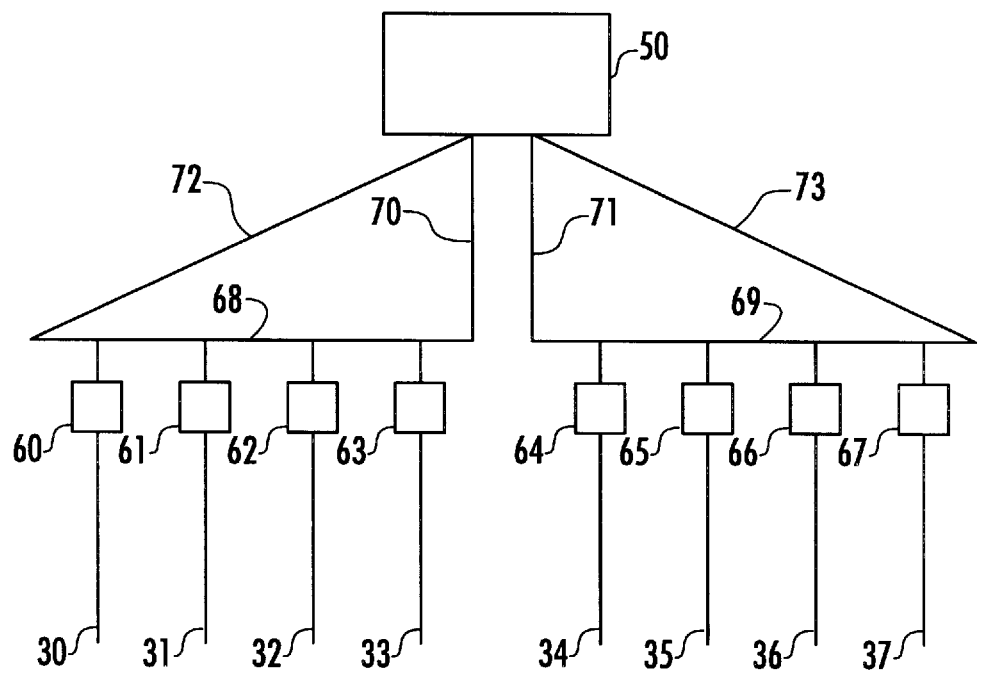
FIG. 4b is a schematic diagram for connecting streamer transmission lines to a recorder on the tow vessel via multiplexers or enabling means and data buses, with multiple transmission lines between the data buses and the recorder.

In FIG. 4b, a similar embodiment is shown which also comprises secondary transmission lines 72 and 73. The spreader buses 68 and 69 are connected at one end to lead-ins 70 and 71 and at the other end are connected to transmission lines 72 and 73, respectively. The transmission lines 72 and 73 are contained within the superwides 16 and 17 referenced in FIG. 3. Thus, in this embodiment command and data signals for four streamers are multiplexed onto a spreader bus for transmission via either a lead-in or a super wide. In further embodiments, both of the embodiments shown in FIGS. 4a and 4b are modified to incorporate any number of streamers and transmission lines, whether those transmission lines are lead-ins or superwides. Thus, multiple lead-ins are attached to the spreader bus to provide redundancy.

In multiplexed electrical transmission embodiments, the transmission media is wire based, normally using copper wire, by means of coaxial cable, twisted pair, triaxial cable or other similar well known types of cable.

In multiplexed transmission embodiments, the data rates on the spreader bus are equal to that in each streamer multiplied by the number of streamers. Embodiments of the invention comprise streamers having data rates between about 5 and about 50 megabits per second (MBPS). Therefore, if four streamers, for example, are connected to the spreader bus, the data rate over the spreader bus is between about 20 and 200 MBPS. Typical data rates for modem seismic streamers are between about 10 and about 20 MBPS. These data rates are within standard communication technology and are known to those of skill in the art. Thus, embodiments of the invention comprise standard transmission cables and multiplexers or enablers which are capable of transmitting data at these rates.

The spreaders also provide the power for each streamer. Similar to the multiplexed transmission scheme described above, the power capacity through the spreader is that required by each streamer multiplied by the number of streamers. Power requirements for streamers of the invention range between about 250 and about 500 watts. Therefore, for example, if four streamers are connected to the spreader bus, the total power requirement ranges between about 1000 and about 2000 watts, depending on the particular embodiment. Power transmission and distribution are standard and well known.

The spreaders and lead-ins are capable, in one embodiment of the invention, of supporting a tensile force of about ten tons. In further embodiments, the tensile forces are much less. The required tensile force capacity, depends on several factors including the force of the paravane, and the exact mechanical configuration.

Figure 5A:
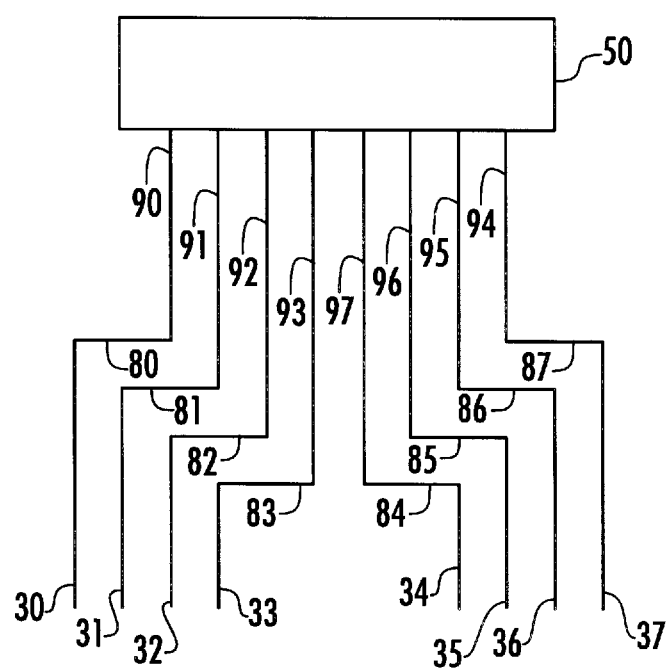
FIG. 5a is a schematic diagram for connecting streamer transmission lines directly to a recorder.
Figure 5B:
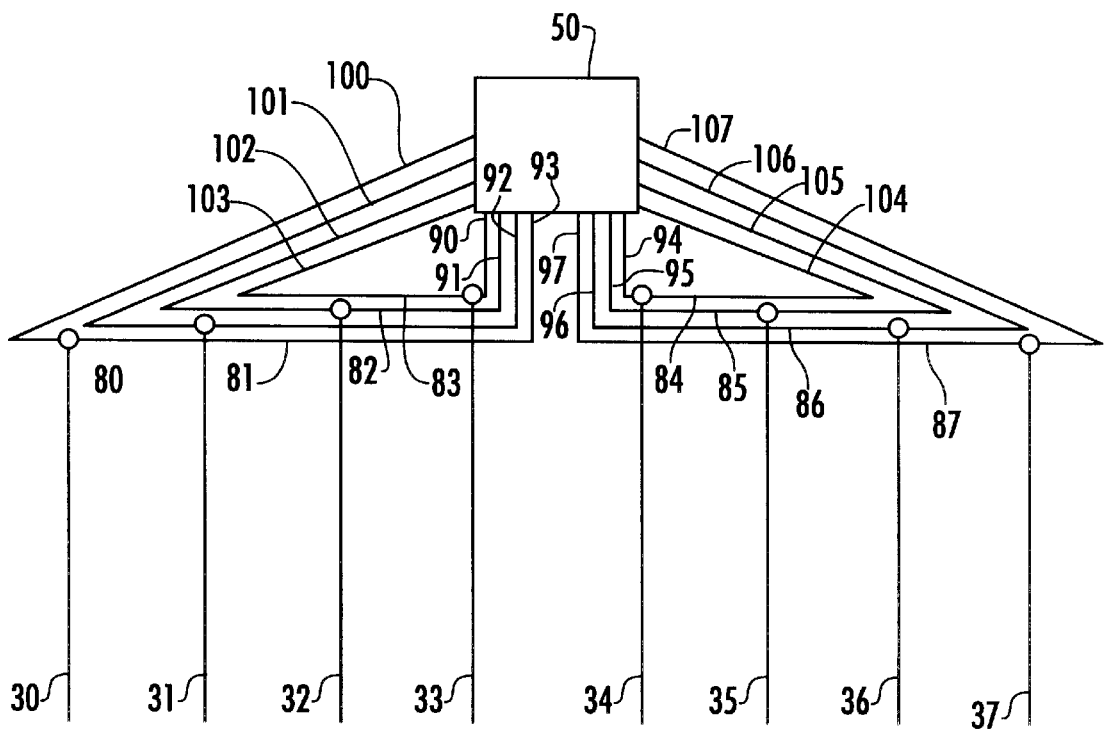
FIG. 5b is a schematic diagram for connecting streamer transmission lines directly to a recorder via multiple transmission lines.

Referring to FIGS. 5a and 5b, embodiments of the present invention are shown wherein separate transmission lines are used to transmit data from the individual streamers to the recorder. In FIG. 5a, streamers 30 through 37 are connected to spreader lines 80 through 87, respectively. Spreader lines 80 through 87 are in turn connected to transmission lines 90 through 97, respectively. Thus, data from each streamer is directly transmitted to the recorder/controller 50 via its own transmission path.

In FIG. 5b, a similar embodiment is shown, which further comprises transmission lines 100 through 107. These transmission lines are connected to spreader lines 80 through 87, respectively. Thus, in this embodiment data is transmitted from each of the streamers to the recorder/controller 50 via either transmission lines 90 through 97 or transmission lines 100 though 107.

In direct electrical transmission embodiments, the transmission media is wire based, normally copper wire, by means of coaxial cable, twisted pair, triaxial cable or other well known types of cable.

Direct optical transmission embodiments also comprise streamers having data rates between about 5 and about 50 megabits per second (MBPS). Typical data rates for modern seismic streamers are between about 10 and about 20 MBPS. The spreader(s) and lead-in(s) in direct transmission embodiments comprise standard transmission cables which are capable of transmitting data at these rates.

Regardless of the transmission means, in direct transmission embodiments, the data rates on the spreader buses is equal to the data rates in each streamer, because there is one bus per streamer.

Figure 6:
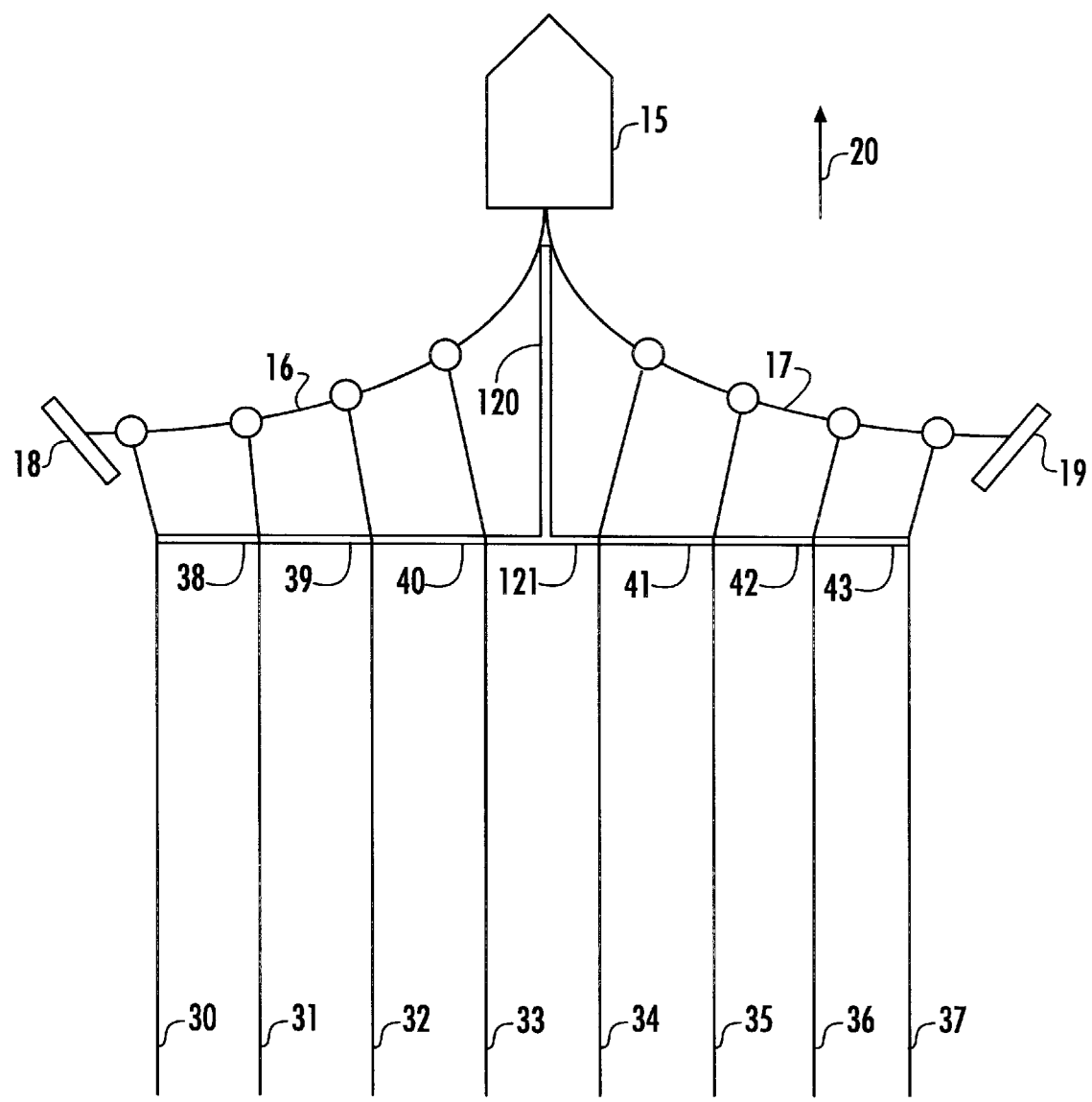

Referring to FIG. 6, an embodiment of the invention is shown comprising a single lead-in. In this embodiment, all data transmissions from each of the streamers on both sides of the vessel 15 are transmitted over spreader buses or spreader lines to a single lead-in 120. Notice further, that the spreader buses of the prior embodiments are connected to each other with a center spreader 121. This single lead-in 120 is shown in FIG. 6 directly behind the vessel 15. However, in alternative embodiments, the lead-in 120 is positioned in any position so as to connect the spreader bus to the vessel.

Figure 7:
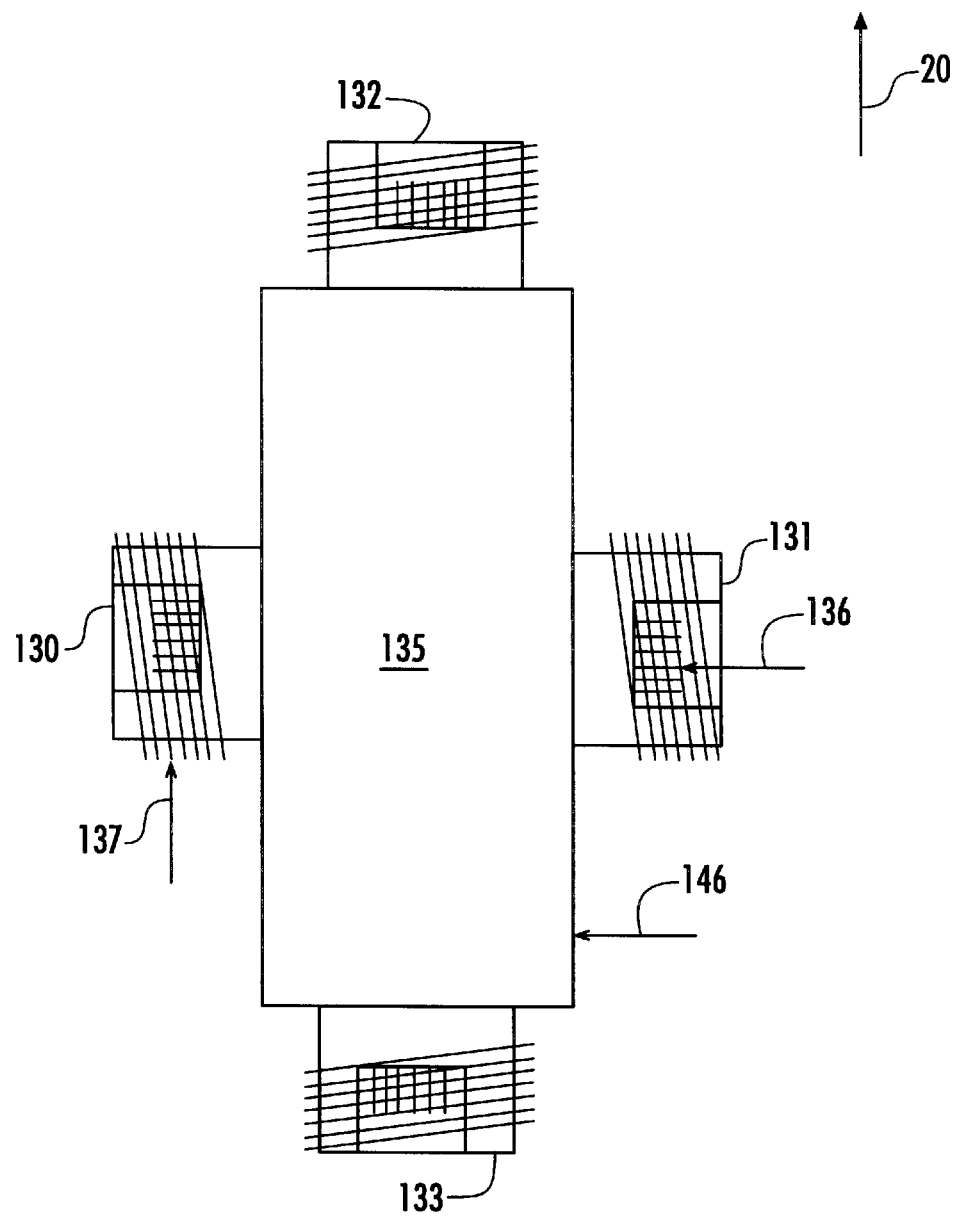
FIG. 7 is a top view of a coupler for connecting streamers and spreader transmission cables.

Referring to FIG. 7, a coupler is shown for connecting streamers, spreaders and lead-ins. The coupler 135 generally comprises a cylindrical main housing 146 to which several connectors 130–133 are attached. In one embodiments, the housing is made of titanium, while in other embodiments, it is made of any water resistant material. Connectors 132 and 133 are attached to opposite ends of the cylindrical housing 146. Connectors 130 and 131 are attached to opposite sides of the housing 146. With the coupler 135 positioned as shown relative to the forward motion 20 of a vessel, a streamer is attached to connector 133 while spreaders are attached to connectors 130 and 131. Connector 132 is used to attached a temporary transmission line which is used to receive position data from the streamer as the streamer is being offloaded or loaded to or from the vessel. However, once the streamer is completely deployed and the coupler 135 is to be deployed into the water, the transmission line is then detached from connector 132 and a seal cap is fixed thereto to protect connector 132 from sea water. Also, when the coupler 135 is to placed in the overall tow configuration at a lead-in junction, a lead-in is attached to connector 132 and one of the side connectors 130 or 131 is capped off.

In one embodiment, couplers are used to connect spreaders and streamers in a modular fashion. Each module comprises a module streamer, a module spreader and a module coupler. The first module is connected by a coupler to a lead-in and an additional streamer. The subsequent modules are connected in series so that the spreader of one module is connected to the coupler of the module before it.

Embodiments comprising any number of modules are possible.

In the embodiment shown, each connector comprises male signal connectors 136. These signal connectors 136 are internally connected to transmission lines which transmit data from the signal connectors in one of the connectors to corresponding signal connectors in each of the remaining three connectors. Regarding multiplexed embodiments of the invention, a switch is placed within the coupler 135 so that signals are intercepted from streamer connector 133 prior to transmission to lead-in and spreader connectors 130–132. Further, each connector comprises a set of threads 137 for attaching the streamers, spreaders and lead-ins to the coupler 135. In general, the materials for the connectors and other embodiments of the connectors will occur to those of skill in the art. The optimum number of signal connectors depend upon the overall system characteristics and required channel capacity as understood by those of skill in the art. U.S. Pat. No. 5,351,218 issued to Hatteland et al. on Sep. 27, 1994, incorporated herein by reference, discloses a variety of electrical connector configurations. In alternative embodiments of the present invention, all of these electrical connectors are incorporated into the system of the present invention. Whether electrical or optical, none of the above connectors is preferred for all embodiments. Depending on the overall configuration used, those of skill in the art will chose from a number of possible connections.

Each of the streamers comprises a leading end and a trailing end with a terminal attached to the leading end. The hydrophone sensors of each streamer are connected to the terminal of the streamer so that data signals from the sensors are transmitted from each sensor to the terminal. Given the particular system specifications, the connection is electrical or optical. The terminal further comprises signal connectors which mate with the signal connectors of the coupler 135. Similarly, each of the spreaders comprise terminals at both ends which attach to the connectors of the coupler 135. The lead-ins also comprise terminals which also attach to the connectors of the coupler 135.

Figure 8:
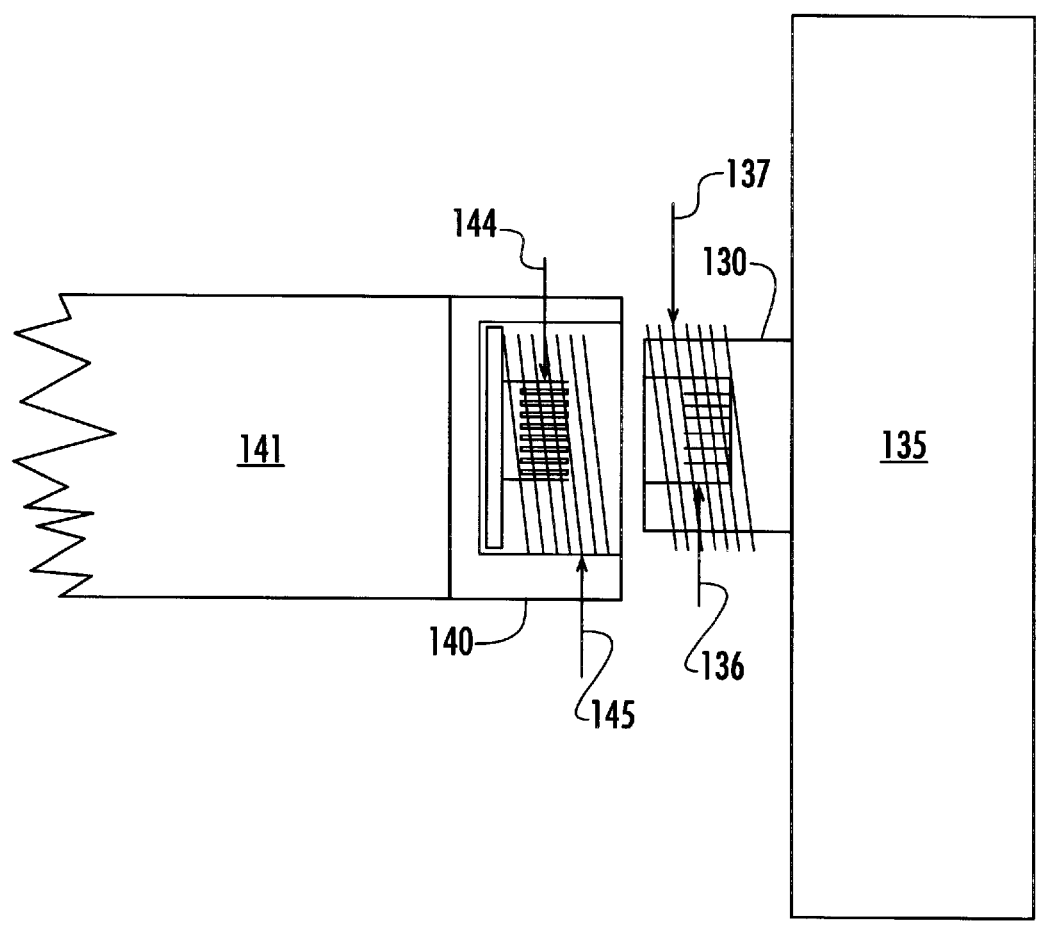
FIG. 8 is a top view of a coupler for connecting streamers and spreaders and a spreader with a terminal.

Referring to FIG. 8, a section of spreader 141 is shown with a terminal 140 attached to its end. The terminal 140 further comprises threads 145 which correspond to the threads 137 of the connector 130 of the coupler 135. Additionally, the terminal 140 comprises female signal connectors 144 which mate with the male signal connectors 136 of the connector 30. Thus, a connection is made simply by threading the terminal 140 onto the connector 130 of the coupler 135. Water tight seals are positioned within the joint to ensure that water does not penetrate to damage the signal connectors. The materials used for the seals will occur to those of skill in the art. In alternative embodiments, terminals are attached to the connector coupler 135 while connectors are attached to the spreader, lead-in or streamer. Further, other types of connector mechanisms are used such as clamps or couplings which are also well known.

It is to be noted that the above described embodiments illustrate only typical embodiments of the invention and are therefore not to be considered a limitation of the cope of the invention which includes other equally effective embodiments.

I claim:

1. A system for transmitting signals between a plurality of towed sensor streamers and a seismic vessel, the system comprising:
a plurality of seismic streamers, wherein each streamer of said plurality of seismic streamers comprises: a leading end, a trailing end, a plurality of sensors located therein and a transmitter of seismic signals received by the plurality of sensors to a terminal located in the leading end of the streamer;
at least one spreader located between the leading ends of two streamers of said plurality of seismic streamers, the spreader comprising:
connectors for connection to the terminals of the streamers,
a spreader terminal, and
a spreader transmitter of signals between the connectors and the spreader terminal;
a lead-in having a lead-in connector for connecting to the spreader terminal and a transmitter of signals between the lead-in connector and the seismic vessel.

2. A system as in claim 1, further comprising a multiplexer of signals between each streamer of said plurality of streamers and said lead-in.

3. A process for communicating signals between a plurality of towed seismic sensor streamers and a seismic vessel, the process comprising:
transmitting signals between at least two streamers of a plurality of streamers;
transmitting signals between a first lead-in and the plurality of streamers; and
transmitting signals between the first lead-in and the vessel.

4. A process as in claim 3, wherein said transmitting signals between at least two streamers of a plurality of streamers comprises transmitting signals through a spreader.

5. A process as in claim 3, wherein said transmitting signals between at least two streamers of a plurality of streamers comprises transmitting signals through a plurality of spreaders.

6. A process as in claim 3, further comprising transmitting signals between a second lead-in and at least one streamer of said plurality of streamers.

7. A process for communicating signals between a plurality of towed seismic sensor streamers and a seismic vessel, the process comprising:
transmitting signals between each streamer of the plurality of streamers and a spreader bus;
transmitting signals between the spreader bus and at least one lead-in, wherein the number of streamers of the plurality of streamers is greater than the number of lead-ins; and transmitting signals through at least one lead-in to the vessel.

8. A process as in claim 7, wherein said transmitting signals between each streamer of the plurality of streamers and a spreader bus comprises transmitting signals between each streamer of the plurality of streamers and a plurality of spreader buses.

9. A process as in claim 8, wherein said transmitting signals between the spreader bus and a plurality of lead-ins comprises transmitting signals between the plurality of spreader buses and the lead-in.

10. A process as in claim 7, wherein said transmitting signals between each streamer of the plurality of streamers and a spreader bus comprises transmitting over the spreader bus all signals between each streamer of the plurality of streamers and a lead-in.

11. A process as in claim 7, further comprising multiplexing the signals between each streamer of the plurality of streamers and the spreader bus.

12. A seismic streamer system comprising:

a lead-in, and multiple streamers;

wherein the multiple streamers are signal-connected to the lead-in, and wherein at least two of the streamers are signal-connected by at least one spreader.

13. A system as in claim 12, wherein the lead-in is connected to a first streamer of the multiple streamers by a first coupler.

14. A system as in claim 13, further comprising a first spreader, wherein the first spreader is connected to the first coupler, wherein signal transmission between the first spreader and the lead-in is enabled, and wherein signal transmission between the lead-in and the first streamer is enabled.

15. A system as in claim 14, further comprising a second coupler, wherein the second coupler is connected to a second streamer of said multiple streamers and to the first spreader, and wherein signal transmission between the second streamer and the lead-in is enabled.

16. A system as in claim 15, wherein the first coupler and the second coupler are interchangeable.

17. A system as in claim 15, further comprising a plurality of streamer-spreader modules wherein each module comprises a module streamer, a module coupler, and a module spreader, wherein said second streamer, said second coupler, and said first spreader define a first streamer-spreader module of said plurality of streamer-spreader modules, wherein a series of streamer-spreader modules are connected, wherein each module spreader in any particular streamer-spreader module is connected to a previous module coupler in the series and to the module coupler of the particular streamer-spreader module, and wherein each module streamer is connected to the module coupler of the particular streamer-spreader module.

18. A system as in claim 12, further comprising another lead-in, wherein at least one of the streamers of said multiple streamers is signal connected to said another lead-in.

19. A system as in claim 12, further comprising a multiplexer of signals between said multiple streamers and said lead-in.

20. A system as in claim 12, further comprising a signal controller which synchronizes and coordinates signal transmissions between said multiple streamers and said lead-in.

* * * * *

(12) REEXAMINATION CERTIFICATE (4588th)
United States Patent
Russell

(10) Number: US 5,835,450 C1
(45) Certificate Issued: Jun. 4, 2002

(54) LEAD-IN CONFIGURATION FOR MULTIPLE STREAMERS AND TELEMETRY METHOD

(75) Inventor: Michael J. Russell, New Milton (GB)

(73) Assignee: PGS Exploration AS, Lysaker (NO)

Reexamination Request:
No. 90/005,721, May 10, 2000

Reexamination Certificate for:
Patent No.: 5,835,450
Issued: Nov. 10, 1998
Appl. No.: 08/668,361
Filed: Jun. 26, 1996

(51) Int. Cl.$^7$ .................................................. G01V 1/20
(52) U.S. Cl. ........................................ 367/20; 114/253
(58) Field of Search ........................... 367/19, 20, 130; 114/244; 181/0.5

(56) References Cited

U.S. PATENT DOCUMENTS

| | | | |
|---|---|---|---|
| 3,414,874 A | 12/1968 | McLoad | 340/7 |
| 4,862,422 A | 8/1989 | Brac | 367/19 |
| 5,408,947 A * | 4/1995 | Curto et al. | 114/253 |

* cited by examiner

*Primary Examiner*—Safet Metjahic

(57) ABSTRACT

A system for transmitting signals between a plurality of towed sensor streamers and a seismic vessel, the system comprising: a plurality of seismic streamers, wherein each streamer of the plurality of seismic streamers comprises: a leading end, a trailing end, a plurality of sensors located therein and a transmitter of seismic signals received by the plurality of sensors to a terminal located in the leading end of the streamer; at least one spreader located between the leading ends of two streamers of the plurality of seismic streamers, the spreader comprising: connectors for connection to the terminals of the streamers, a spreader terminal, and a spreader transmitter of signals between the connectors and the spreader terminal; a lead-in having a lead-in connector for connecting to the spreader terminal and a transmitter of signals between the lead-in connector and the seismic vessel. A seismic streamer system comprising: a lead-in, and multiple streamers; wherein the multiple streamers are signal-connected to the lead-in, and wherein at least two of the streamers are signal-connected by at least one spreader. A process comprising: transmitting signals between at least two streamers of a plurality of streamers; transmitting signals between a first lead-in and the plurality of streamers; and transmitting signals between the first lead-in and the vessel. A process comprising: transmitting signals between each streamer of the plurality of streamers and a spreader bus; transmitting signals between the spreader bus and at least one lead-in, wherein the number of streamers of the plurality of streamers is greater than the number of lead-ins; and transmitting signals through at least one lead-in to the vessel.

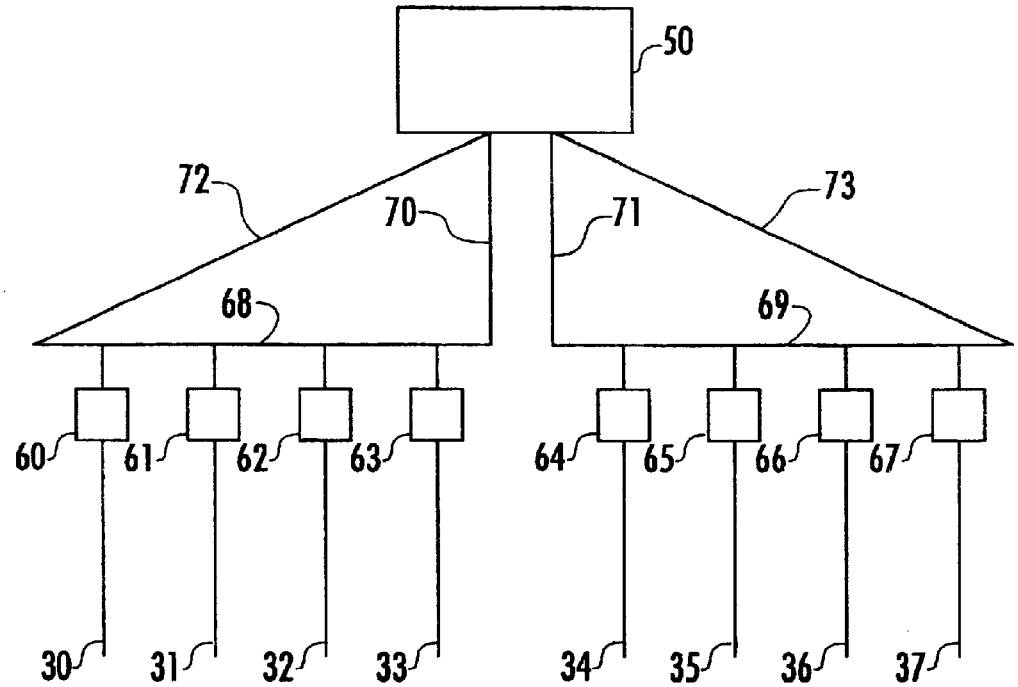

REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1–20 is confirmed.

\* \* \* \* \*